United States Patent
Goldstein et al.

(10) Patent No.: US 10,984,185 B2
(45) Date of Patent: Apr. 20, 2021

(54) SYSTEM AND METHOD FOR DIALOG CUSTOMIZATION

(71) Applicant: Wix.com Ltd., Tel Aviv (IL)

(72) Inventors: Yuval Goldstein, Herzliya (IL); Avi Marcus, Haifa (IL); Sharon Ptashek, Tel Aviv (IL); Kfir Golan, Mitzpe Ramon (IL); Daniel Shmuglin, Holon (IL)

(73) Assignee: Wix.com Ltd., Tel Aviv (IL)

( * ) Notice: Subject to any disclaimer, the term of this patent is extended or adjusted under 35 U.S.C. 154(b) by 0 days.

(21) Appl. No.: 15/657,156

(22) Filed: Jul. 23, 2017

(65) Prior Publication Data

US 2017/0322922 A1 Nov. 9, 2017
US 2018/0150447 A2 May 31, 2018

Related U.S. Application Data

(63) Continuation of application No. 14/207,930, filed on Mar. 13, 2014, now Pat. No. 9,753,911.

(60) Provisional application No. 61/781,866, filed on Mar. 14, 2013.

(51) Int. Cl.
*G06F 17/24* (2006.01)
*G06F 40/186* (2020.01)
*G06F 40/103* (2020.01)
*G06F 3/0481* (2013.01)

(52) U.S. Cl.
CPC .......... *G06F 40/186* (2020.01); *G06F 3/0481* (2013.01); *G06F 40/103* (2020.01)

(58) Field of Classification Search
CPC ..... G06F 17/248; G06F 17/211; G06F 3/0481
See application file for complete search history.

(56) References Cited

U.S. PATENT DOCUMENTS

| | | | |
|---|---|---|---|
| 5,950,001 | A | 9/1999 | Hamilton |
| 5,991,534 | A | 11/1999 | Hamilton |
| 6,263,352 | B1 | 7/2001 | Cohen |
| 6,546,397 | B1 | 4/2003 | Rempell |
| 6,684,369 | B1 | 1/2004 | Bernardo |

(Continued)

FOREIGN PATENT DOCUMENTS

| | | |
|---|---|---|
| JP | 2001142673 | 5/2001 |
| JP | 2003196264 | 7/2003 |

(Continued)

OTHER PUBLICATIONS

International Search Report for corresponding PCT application PCT/IB2014/059734 dated Sep. 15, 2014.
Supplementary European Search Report for corresponding EP application 14 76 3655 dated Jan. 20, 2017.
English Abstract of JP 2003196264 downloaded from Google Patents on Sep. 24, 2019.
English Abstract of JP 2001142673 downloaded from Google Patents on Sep. 18, 2019.
English Abstract of JP 2009053912 downloaded from Espacenet on Sep. 18 2019.

(Continued)

*Primary Examiner* — Seth A Silverman
(74) *Attorney, Agent, or Firm* — Heidi Brun Associates Ltd.

(57) ABSTRACT

A system includes, for a selection of objects on a displayed page of the system, each object having pre-defined customizable attributes and non-customizable attributes, a sorter to sort the customizable attributes of the selected objects. The system also includes a dialog builder to build a customization dialog specific to the selection based on the sorted pre-defined customizable attributes, a displayer to display the dialog and an updater to receive input according to the dialog and to update the customizable attributes according to the input.

19 Claims, 9 Drawing Sheets

(56) References Cited

U.S. PATENT DOCUMENTS

| | | |
|---|---|---|
| 7,685,519 B1 | 3/2010 | Duncan |
| 7,941,438 B2 | 5/2011 | Molina-Moreno |
| 7,958,457 B1 | 6/2011 | Brandenberg |
| 9,753,911 B2 | 9/2017 | Goldstein |
| 2003/0105682 A1 | 6/2003 | Dicker et al. |
| 2006/0206517 A1 | 9/2006 | Hyder |
| 2007/0198910 A1 | 8/2007 | Jensen |
| 2009/0006454 A1 | 1/2009 | Zarzar |
| 2009/0016086 A1 | 1/2009 | Huynh et al. |
| 2009/0172526 A1* | 7/2009 | Sorenson ............... G06F 17/211 715/273 |
| 2009/0300656 A1 | 12/2009 | Bosworth |
| 2010/0205551 A1 | 8/2010 | Underwood |
| 2010/0299586 A1* | 11/2010 | Yoo ....................... G06F 17/212 715/207 |
| 2011/0025853 A1 | 2/2011 | Richardson |
| 2011/0191671 A1 | 8/2011 | Hammond |
| 2011/0214077 A1* | 9/2011 | Singh ..................... G06F 9/451 715/762 |
| 2012/0117453 A1 | 5/2012 | Mackinlay et al. |
| 2012/0278704 A1 | 11/2012 | Ying et al. |
| 2013/0174014 A1* | 7/2013 | Kwan ............... G06F 17/30905 715/234 |

FOREIGN PATENT DOCUMENTS

| | | |
|---|---|---|
| JP | 2005149512 | 6/2005 |
| JP | 2005196642 | 7/2005 |
| JP | 2008140044 | 6/2008 |
| JP | 2009053912 | 3/2009 |
| JP | 2011159284 | 8/2011 |
| WO | 2010104880 | 9/2010 |

OTHER PUBLICATIONS

English Abstract of JP 2005196642 downloaded from Espacent on Sep. 11, 2019.
English Abstract of JP 2005149512 downloaded from Espacenet on Sep. 11, 2019.
English Abstract of JP 2008140044 downloaded from Espacenet on Sep. 11, 2019.
Preliminary Examination for corresponding Brazilian application BR 11 2015 022792 9 dated Feb. 12, 2020.

* cited by examiner

HIERARCHICAL VIEW
- MENU VIEW
- SECTION VIEW
- MULTIPLE DISH VIEWS

LAYOUT SELECTION AREA

CUSTOMIZATION AREA

Restaurant Menu

Change the design of your menu and try out the different menu layouts. To add new items to your menu, click Edit Menus.

Choose Menu
Edit Menu

Choose Layout

Language Direction

Section image height: 120
- ☐ Show section image
- ☐ Show section separator
- ☐ Show dish description
- ☒ Show dish price
Item spacing: 15

☐ Show on all pages

Lunch
Light and delicious food to get you through the day.

Salads
Fresh salads from our organic farm.

Beets & Beans Salad $11.25
Roasted beet, green beans and crumbled feta cheese salad, drizzled with honey mustard vinaigrette.

Caprese Salad $10.00
Italian buffalo mozzarella, fresh red tomatoes and basil, lightly dressed with and olive oil and herb dressing.

Rich Tuna Tartar $12.50
Thick raw tuna, blue cheese and walnuts served on a bed of arugula and honey sesame vinaigrette.

Mixed Salad $10.25
Fresh spinach and arugula served with assorted seasonal vegetables and garlic croutons, dressed in a french vinaigrette.

Sides & Starters

Lemon Garlic Shrimp $10.00
Served with a sauce of carrots, onion and parsley.

Asparagus Spears $8.50
Chilled Asparagus spears served with our secret hollandaise sauce.

created with Wix.com

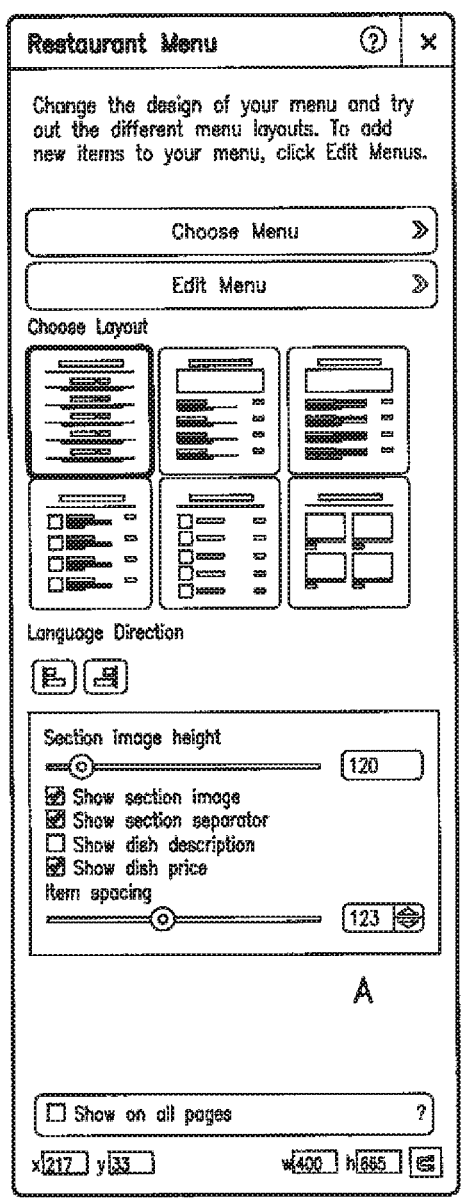
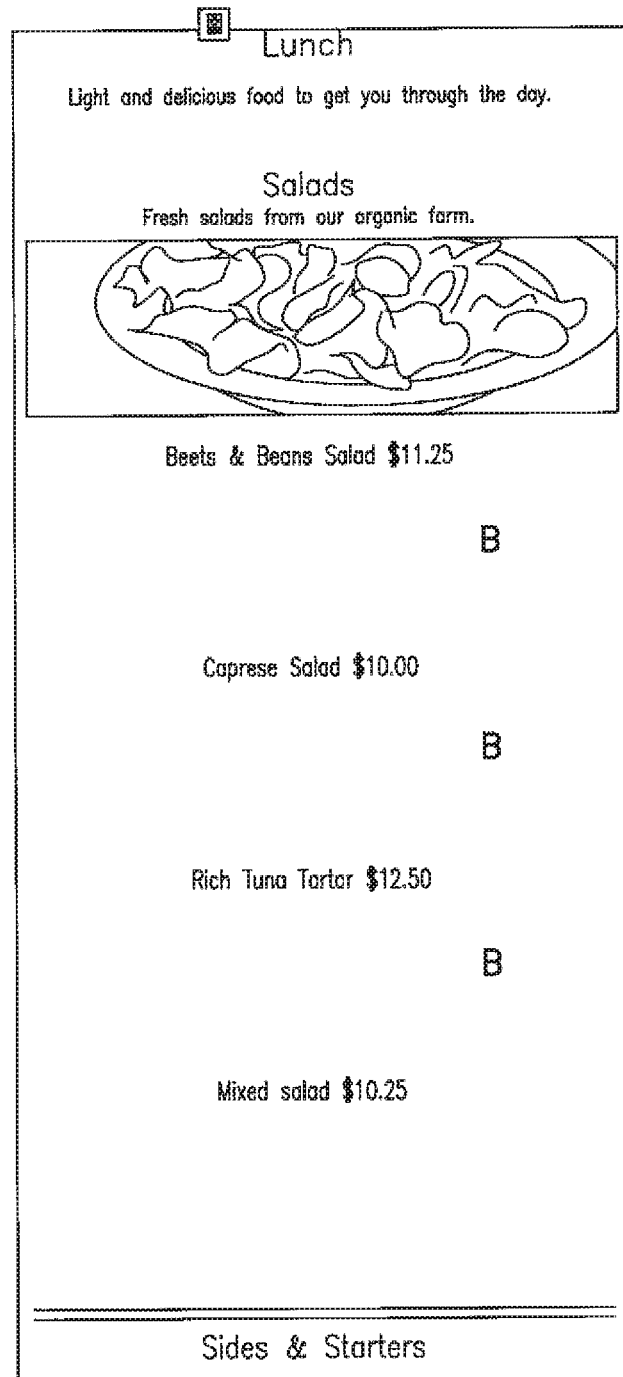
FIG.3

FIG. 9

SYSTEM AND METHOD FOR DIALOG CUSTOMIZATION

CROSS REFERENCE TO RELATED APPLICATIONS

This application is a continuation of U.S. application Ser. No. 14/207,930 filed Mar. 13, 2014, which claims benefit from U.S. Provisional Patent Application No. 61/781,866 filed Mar. 14, 2013, which are both hereby incorporated in their entirety by reference.

FIELD OF THE INVENTION

The present invention relates to component based application builders generally and to dialog customization in particular.

BACKGROUND OF THE INVENTION

There are many commercially available on and off-line component based application builders such as website building systems, web page construction systems, desktop application building system and mobile application building systems that can be used to create and edit websites and other on-line or off-line applications. The present application refers to website building systems for simplicity but its features may also be applied to the above-mentioned component based application builders.

Website building systems are based on the notion of pages which include objects which may be components or non-component objects. Components may be atomic or container components. Container components may be single-page containers or multi-page containers (which include multiple mini-pages separate from each other). Multi-page containers may display a single mini-page at a time (single page display), or may display multiple or all of the mini-pages (gallery/carousel display) a multi-page container may have a fixed display mode (e.g. gallery display only), or may allow switching between multiple display modes. Non-component objects may include relationship objects, views and templates as further described below.

Components may have content, e.g. text for text component, an image for image component etc. They also have additional attributes, including in particular display attributes (e.g. color, frames) and layout attributes (size and position).

Components may be content-less such as a star-shape which does not have any internal content (through it has color, size, position and some other attributes) or may have internal content, such as a text paragraph component, whose internal content includes the displayed text, as well as font, formatting and layout information. This content may, of course, vary from one instance of the text paragraph component to another.

Website building systems may also support inheritance relationships between objects such that when an object A inherits from an entity B (called parent), the sub-elements of A are copied from the sub-entities of B etc.

Website building systems can also be extended using third party applications and components embedded in them. Such third party applications may be included in the website building system design environment or may be purchased (or otherwise acquired) separately through a number of distribution mechanisms, such as from an application store (AppStore) integrated into the website building system, or from a separate, web-based or standalone application repository (or AppStore) operated by the website building systems (WBS) vendor or by another entity. Third party applications may also be obtained directly from the third party application vendor (through an AppStore or not)—which would provide an actual installation module, or just an activation or access code.

Therefore a typical site created by a website building system may have pages consisting of instances of regular components and third party application components. Such pages may also include linking components, which display data items from internal or external data sources formatted using page section templates (known as views) as further described below.

Dialog interfaces are an important feature of any on-line application builder (such as an online website building application). They allow the pertinent system to present information or request input to or from the designer and/or end user.

SUMMARY OF THE PRESENT INVENTION

There is provided, in accordance with a preferred embodiment of the present invention, a system including, for a selection of displayed objects of the system, where at least one of the selected objects has pre-defined customizable attributes and non-customizable attributes, a sorter to sort the customizable attributes of the selected objects; and a dialog builder to build a customization dialog specific to the selection based on the sorted pre-defined customizable attributes.

Moreover, in accordance with a preferred embodiment of the present invention, the system also includes a displayer to display the dialog and an updater to receive input according to the dialog and to update the customizable attributes according to the input.

Further, in accordance with a preferred embodiment of the present invention, each at least one selected object has at least one associated customization record listing the pre-defined customizable attributes.

Still further, in accordance with a preferred embodiment of the present invention, the objects are at least one of atomic component, container component, linking component, third party component, template, view and a relationship object representing a relationship between at least two objects.

Additionally, in accordance with a preferred embodiment of the present invention, the selection is at least one of a pre-defined selection, user selected and an expansion of a selection.

Moreover, in accordance with a preferred embodiment of the present invention, the expansion is at least one of a selection expanded to include contained objects, a selection expanded to include related objects and a selection expanded to include inherited objects.

Further, in accordance with a preferred embodiment of the present invention, the selection is at least one of a direct selection of at least one object, a selection according to an intersection or inclusion with a page area selected by the user and a selection according to a user defined query.

Still further, in accordance with a preferred embodiment of the present invention, the system supports the display of multiple instances of objects on a single page where the selection includes a subset of the multiple displayed object instances.

Additionally, in accordance with a preferred embodiment of the present invention, the sorter merges multiple configurable attribute entries according to a common property of the entries.

Moreover, in accordance with a preferred embodiment of the present invention, the sorter sorts attributes according to priority.

Further, in accordance with a preferred embodiment of the present invention, the sorter sorts attributes according to hierarchical ID structure.

Still further, in accordance with a preferred embodiment of the present invention, the sorter arranges attributes according to hints provided in the objects to be affected.

Additionally, in accordance with a preferred embodiment of the present invention, the sorter sorts attributes according to priority based on the at least one associated customized record.

Moreover, in accordance with a preferred embodiment of the present invention, the sorter sorts according to a pre-defined condition.

Further, in accordance with a preferred embodiment of the present invention, conflicting associated customized records are united based on at least one of priority, common values and related object properties.

Still further, in accordance with a preferred embodiment of the present invention the dialog is at least one of linear, hierarchical and two-dimensional.

Additionally, in accordance with a preferred embodiment of the present invention, the dialog is laid out according to at least one of customization priority parameters, customization hierarchy parameters, location of the configured objects component on the page, and dialog layout hints provided in the objects to be affected.

Further, in accordance with a preferred embodiment of the present invention, the updater updates using a formula pre-defined for the customizable attributes.

Still further, in accordance with a preferred embodiment of the present invention, the updater updates continuously as the attributes are modified to provide a WYSIWYG (what you see is what you get) effect.

Additionally, in accordance with a preferred embodiment of the present invention the updater updates gradually as the attributes are modified to provide an animation between two versions of the object having different the customizable attribute values.

Moreover, in accordance with a preferred embodiment of the present invention, the updater updates a view within at least one of a linking component, a specific view instance selected by a user and a view template definition.

Further, in accordance with a preferred embodiment of the present invention, the system is one of the following: a website building system, a web page construction system, an on-line application building tool, an off-line application building tool, and a mobile application building tool.

There is provided, in accordance with a preferred embodiment of the present invention, a method including for a selection of displayed objects, where at least one of the selected objects has pre-defined customizable attributes and non-customizable attributes, sorting the customizable attributes of the selected objects and building a customization dialog specific to the selection based on the sorted pre-defined customizable attributes. for a selection of displayed objects, wherein at least one of said selected objects has pre-defined customizable attributes and non-customizable attributes, sorting said customizable attributes of said selected objects Further, in accordance with a preferred embodiment of the present invention, the method includes displaying the dialog and receiving input according to the dialog and updating the customizable attributes according to the input.

Further, in accordance with a preferred embodiment of the present invention, the at least one selected object has at least one associated customization record listing said pre-defined customizable attributes.

Still further, in accordance with a preferred embodiment of the present invention, the objects are at least one of atomic component, container component, third party component, template, view and a relationship object representing a relationship between at least two objects.

Additionally, in accordance with a preferred embodiment of the present invention, the selection is at least one of a pre-defined selection, user selected and an expansion of a selection.

Moreover, in accordance with a preferred embodiment of the present invention, the expansion is at least one of a selection expanded to include contained objects, a selection expanded to include related objects and a selection expanded to include inherited objects.

Further, in accordance with a preferred embodiment of the present invention, the selection is at least one of a direct selection of at least one object, a selection according to an intersection or inclusion with a page area selected by the user and a selection according to a the user defined query.

Still further, in accordance with a preferred embodiment of the present invention, method comprises displaying multiple instances of objects on a single page and wherein the selection comprises a subset of the multiple displayed object instances.

Additionally, in accordance with a preferred embodiment of the present invention, the sorting includes merging multiple configurable attribute entries according to a common property of the entries.

Moreover, in accordance with a preferred embodiment of the present invention, the sorting is according to priority.

Further, in accordance with a preferred embodiment of the present invention, the sorting is according to hierarchical ID structure.

Still further, in accordance with a preferred embodiment of the present invention, the sorting is according to hints provided in the objects to be affected.

Additionally, in accordance with a preferred embodiment of the present invention, the sorting is according to priority based on the at least one associated customized record.

Moreover, in accordance with a preferred embodiment of the present invention, the sorting is according to a pre-defined condition.

Further, in accordance with a preferred embodiment of the present invention, the method includes uniting conflicting at least one associated customized records based on at least one of priority, common values and related object properties.

Additionally, in accordance with a preferred embodiment of the present invention, the dialog is at least one of linear, hierarchical and two-dimensional.

Further, in accordance with a preferred embodiment of the present invention, the method includes laying out the dialog according to at least one of customization priority parameters, customization hierarchy parameters, location of the configured objects on the page and dialog layout hints provided in the objects to be affected.

Still further, in accordance with a preferred embodiment of the present invention, the updating uses a formula pre-defined for the customizable attributes.

Additionally, in accordance with a preferred embodiment of the present invention, the updating is continuous as the attributes are modified to provide a WYSIWYG (what you see is what you get) effect.

Moreover, in accordance with a preferred embodiment of the present invention, the updating is gradual as the attributes are modified to provide an animation between two versions of the components having different the customizable attribute values.

Further, in accordance with a preferred embodiment of the present invention, the updating comprises revising a view within at least one of a linking component, a specific view instance selected by a user and a view template definition.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1 is a screenshot of a dialog for content entry for a restaurant website;

FIG. 2 is a screenshot of a user interface which includes a customization dialog for a menu and its settings panel for a restaurant website;

FIG. 3 is a screenshot of a customization dialog to change the inter-item spacing for all displayed items;

FIG. 9 is a screenshot of a user interface which shows an alternate layout display (including alternate customization dialog) for a menu of a restaurant website.

Figure 4:
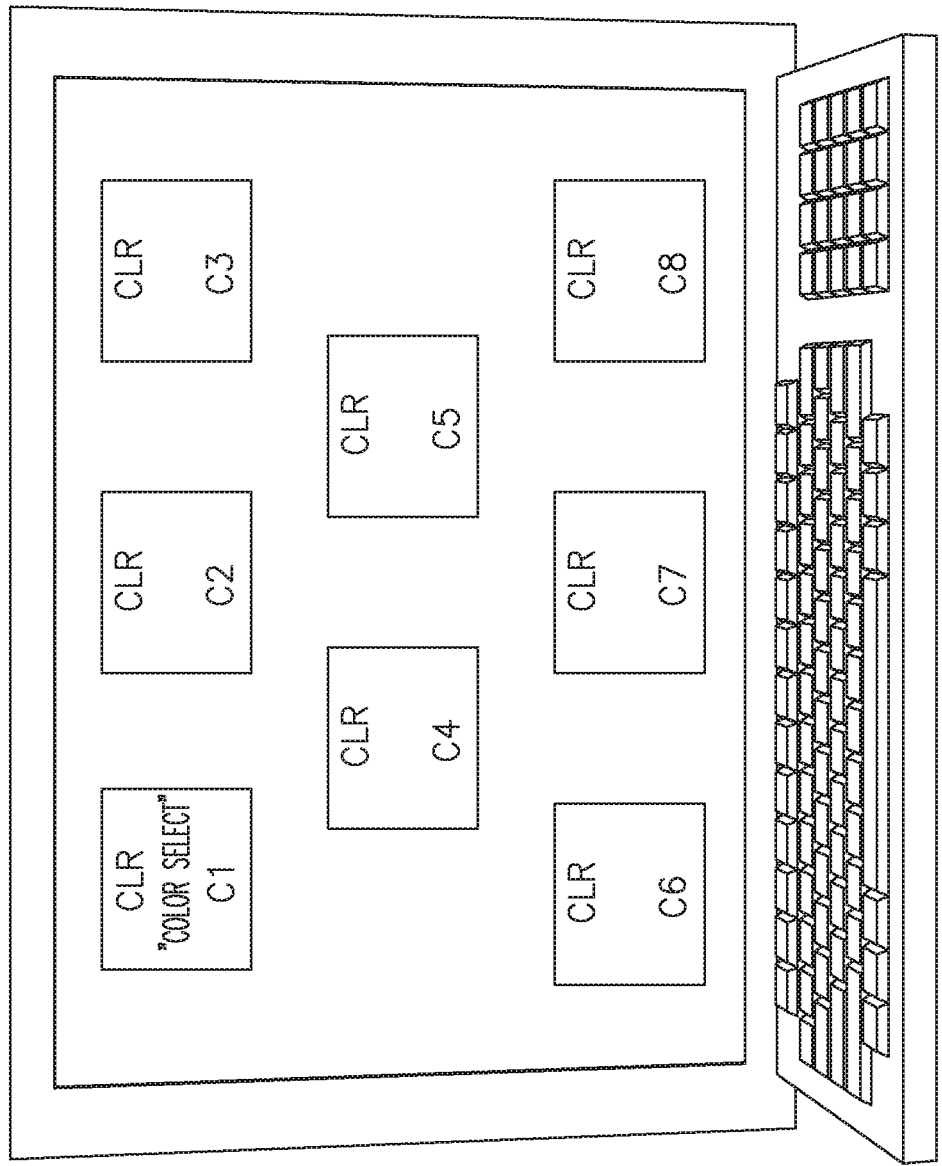
FIG. 4 is a schematic illustration of a website page containing 8 different text components.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Website building systems may typically provide to a designer, the capability to customize website objects, including particular views, items and item/view combinations. In the discussion below we shall refer to customization of components (which is the most common case). However, the description of the invention below is fully applicable to the customization of non-component objects, including views and templates in particular. As discussed herein above, many website components have numerous configurable attributes, including those related to the component itself (e.g. background color, font of displayed text), its display format (e.g. a particular date format), its display parameters (such as number of rows and columns) as well as those related to the specific instance (e.g., position and size). These configurable attributes may be used to configure the pertinent instance through the regular website building system user interface or via another means such as an API or a web service. The website building system may also support relationship objects which may also be customized. Such relationship objects represent relationships between website building system components (or other objects). Examples include dynamic layout anchors (e.g. those which define the distance between components) and operational relationships (e.g. those which define how the content change of one component affects another component) etc.

Components may also have non customizable or conditionally customizable parameters and attributes. For example a given item may be customized, but only when displayed in a given view. These customization options may be open to the designer (or to an end user) according to pre-determined specific modification or design privileges only.

For third party applications, the third party application vendor may define the particular configurable attributes which can be used to configure a third party application instance. These can be low-level such as a displayed frame type or high level such as a maximal allowed purchase for an e-commerce third party application.

The created web site may also include linking components, which display data items from an external data sources formatted using page section templates (known as views). Linking components are further discussed in U.S. patent application Ser. No. 14/207,761 entitled "DEVICE, SYSTEM, AND METHOD OF WEBSITE BUILDING BY UTILIZING DATA LISTS", filed Mar. 13, 2014 and assigned to the common assignee of the present invention. The linking component may link to an internal or external database, containing one or more collections consisting of data items. When linking components are displayed, the database is accessed to generate the current list of data items to be displayed. It will be appreciated that views may be associated with each data item, and that the data items may be displayed—either one at a time in a given area (known as expand/zoom mode display) or may be displayed as multiple items together (known as list or gallery mode display). Different data items may be displayed using different views.

It will be further appreciated that the page construction process may also create additional (non-component) objects also with configurable attributes. For example, two components may be linked with a dynamic layout anchor and the anchor length (i.e. the spacing between the components) may be a configurable attribute.

Applicants have realized that for such configurable components, a single customization may potentially affect multiple components, for example the same color adaptation may be applied to multiple components within the same display in order to remain harmonious. Another example is the distance between the right edge of the view and two components within the same view which may be adjusted but must remain the same for both components, or may need to retain a given ratio.

Customization may affect attributes of components of specific items or views involved. Customization options may include: should we display a given component (yes/no), fixed content (e.g. title text), display attributes (e.g. font, size and color), screen distances (the distance between the dish name and its description for the restaurant example above); counts (e.g. the number of columns in a multi-column display) and generic parameters which are handed over to the component handling the display.

Applicants have also realized that current customer dialogs or interfaces may require the designer to plough though lists of individual components, all with multiple attributes (some configurable and some not) in order to make an update or change to a specific component. For a designer to update the background color of 8 different components of the same page, the designer would have to update the background color attribute for each component individually. This process may be laborious and time consuming. It will be appreciated as discussed here in above, that even though not all attributes are editable, the update dialog presented to the designer may not differentiate between the two types of attributes and both may be presented to the designer.

Applicants have further realized that the creation of a customized dialog, tailored to the pertinent components that may require the above mentioned update may enable the bulk update of certain attributes. Applicants have also realized that a customized dialog may present to a junior designer (who uses the pertinent website building system to build his web site), a list of customizable attributes only for the component in question which may have been predetermined by a senior designer. Applicants have further realized that a particular view (or presentation) of components may automatically be able to determine the specific attribute and values which may be adjusted and be able to rank the importance of the customization. Some customizations may be more important than others and should be easier to access.

It will be appreciated, in accordance to an embodiment of the present invention, that the initial construction of templates, views and possibly some pages (from herein known as edited pages) as well as any potential customizations may be performed by the manufacturers of the pertinent web site building system. A senior designer may then use the pertinent web site building system to set up and create customization records (as described in more detail herein below) The finished results may be used by a more junior designer 5 who may use the prepared templates etc. to create his own website. It will be appreciated that the senior designer may also determine at design time which attributes may be potentially configurable by the junior designer and which may be exposed and available to him. It will also be appreciated that there may be cases when both the senior and junior designers are either the same person (or company).

Figure 1:
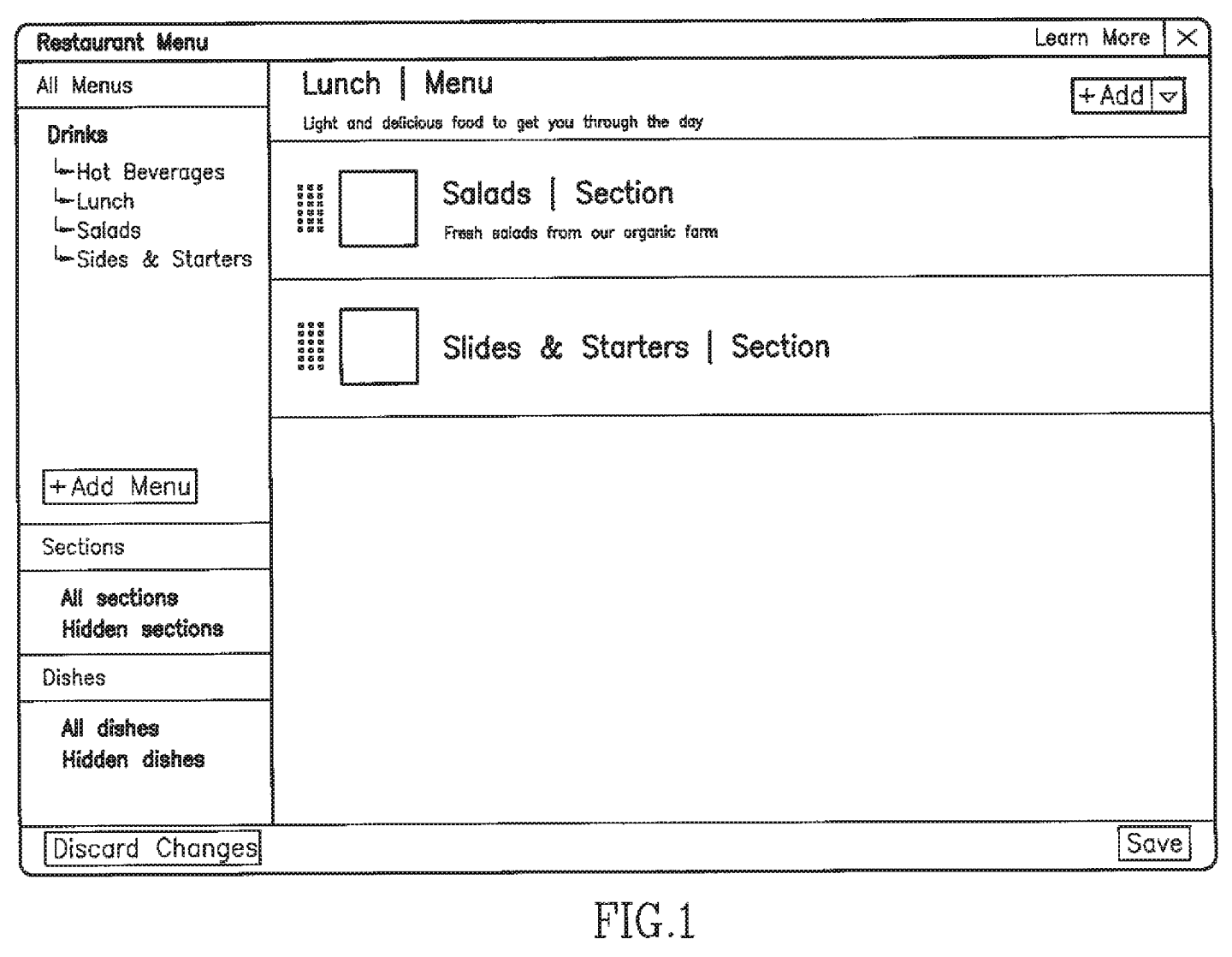
Figure 9:
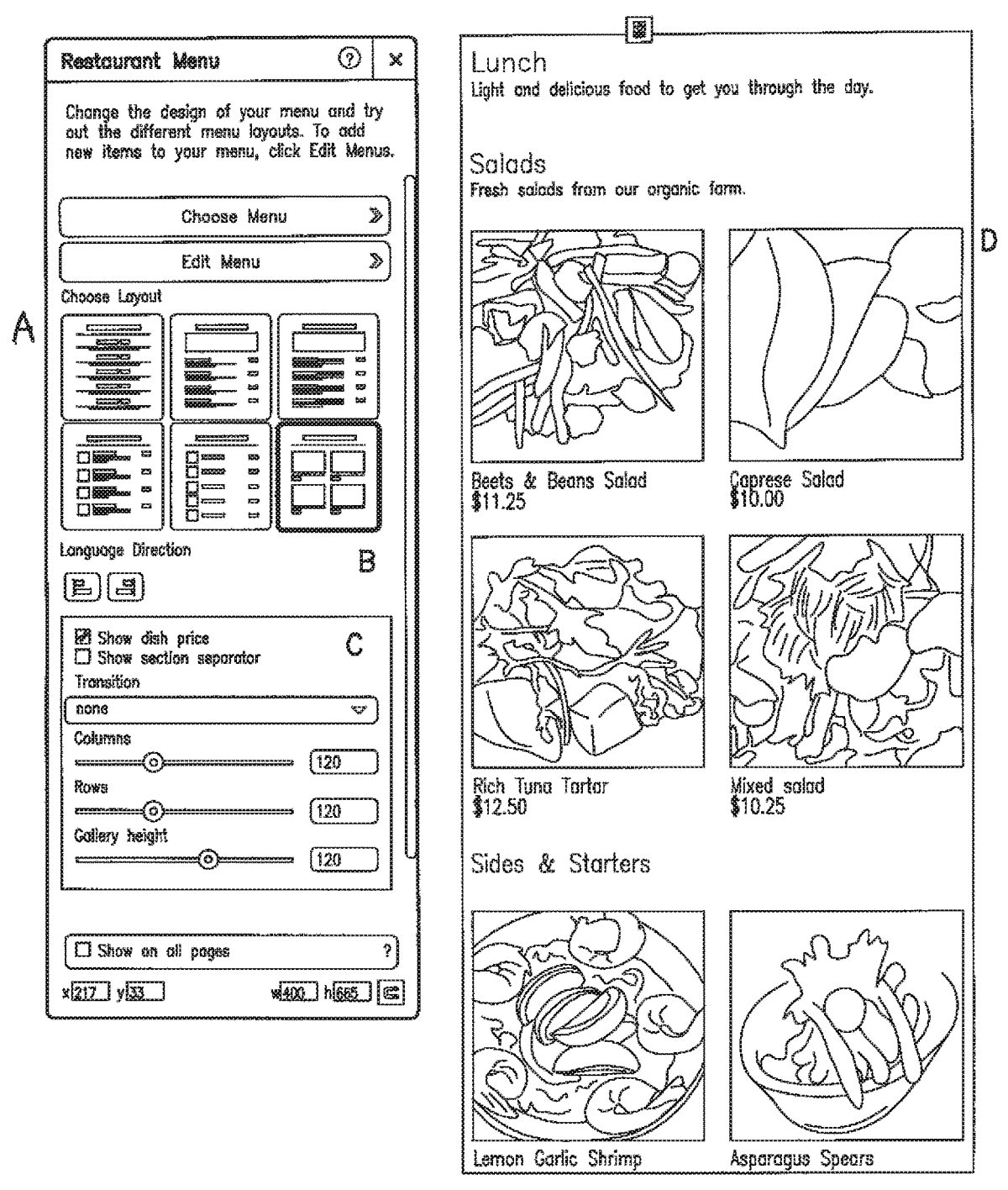

It will be appreciated that junior designer 5 may build his own site by selecting which layout to use (from those available) from the website building system, customizing it and then entering specific data through an interface provided by the system as illustrated in FIG. 1 to which reference is now made or by or connecting to a data source. The layout selection determines which set of views (partial page templates) to use as illustrated in FIG. 2 to which reference is now made. FIG. 2 illustrates the stage of website design for a restaurant website for designer 5 in his working environment and shows a customization area, a layout selection area and the different views that may be presented. Designer 5 may then adapt the web site according to his needs. Therefore designer 5 may chose a portion of the layout to customize either by view, by object or by region etc. The effect of alternative layout selection is further illustrated in FIG. 9 to which reference is now made. FIG. 9 illustrates a case in which designer 5 has selected a gallery-style pictorial layout [B], instead of the previous list-style layout [A] while still using the same underlying data. As can be seen, the data display area [D] has changed its format, and the customization set [C] also switches to the customization appropriate to this alternate layout.

It will be appreciated that the website building system may display multiple instances of some of the views in the same area of a linking component (such as the multiple instances of the single dish view template). As shown in FIG. 3, to which reference is now made, the customization may affect all displayed copies of the same view, so that designer 5 may (for example) change the inter-item spacing for all displayed items (marked B) with a single change (marked A)—changing the "item spacing" customization from a value of 15 (as in FIG. 2) to the current value of 123 (as in FIG. 3). This change may also affect all instances of the "dish" view within the linking component—including those that are not currently visible (due to scrolling).

As discussed hereinabove, a senior designer (before the website building stage) may create customization records which may be associated with each component. Each customization record may specify how a single attribute of a single component may be configured through an automatically generated configuration dialog (as described in more detail herein below). Customization records may designate the attributes which are customizable for the component in question as well as extra record fields such as a customization ID, customization prompt text (e.g. "Select background color") and any additional information such as which component attributes are customizable and which are not.

The customization record may also include information such as a specific implementation formula which may specify how the customization value is applied, allowing for cases in which a customization value is applied to an attribute using not just pure assignment (e.g. "assign to attribute X a value which is 80% of the entered value"). Such formulae may also reference the existing attribute value, as well as the values of other attributes of the component. The customization record may also specify under what conditions an attribute is customizable or not.

It will be appreciated that a customization record may (and typically will) also include a default value. This value may be assigned to the affected attributes when the customization dialog is presented for the first time, modifying their value. Once designer 5 has entered a new value for the customization, this value is saved in the customization record (in addition to being applied to the affected attributes) so it would be re-displayed and used whenever the customization record is invoked again (as discussed in more detail herein below).

It will be appreciated that a single component may have associated with it more than one customization record, reflecting the possible customizations of different attributes of the same component. The customization records for a single component may include multiple records related to the same attribute—for example if an attribute is modified in different ways using different implementation formulas. The different customization records for the same component will typically have unique customization ID, but this is not always the case—for example, a single customization ID may be used for two records which modify the right and left spacing of the component.

In an alternative embodiment, the senior designer may define customization records at a higher entity level (such as the view level, a container level, the entire page level or the website level). In such a case, the per-component customization records may contain just a customization ID which references the higher-level customization records.

It will be appreciated that the customization records created by a senior designer may override any customization records supplied by the objects in the edited page in order to define specific customizable attributes affecting specific potential customizable components. For example, an edited page P may contain 8 different text components (C1 . . . C8) as is illustrated in FIG. 4 to which reference is now made, each of which has a potential configurable attribute "background color" (clr) and type "color select". The senior designer may decide to expose all 8 potential configurable attributes as actual configurable attributes. In such a case, they may be united under a single "select background color" configurable attribute (since they may all have the same customization ID as described in more detail herein below). Therefore when the component dialog is displayed, a single changed setting may be applied to all 8 components. The senior designer may also decide to create two new actual configurable attributes "select background color no. 1" for components C1 to C3 and "select background color no. 2" for components C4 to C6. To do this, the senior designer may assign an alternate (and new) customization ID of "bg-color-1" (with matching prompt text) to the "bg-color" of the customization records of components C1 to C3. The same procedure may be performed for components C4 to C6 with an alternate customization ID of "bg-color-2". Thus in the latter case, only the two new alternate customization ID's may be presented as customizable attributes and not the 8 underlying original customization IDs.

It will also be appreciated that the senior designer may create new customization records for particular components that may override any pre-defined or pre-supplied components through inheritance or supplied by other objects in the edited page.

It will further be appreciated that designer 5 may select a set of objects to customize in which none of the selected objects has any customizable attribute. In such a case, there is no defined customization, and no customization dialog would be generated. Furthermore, it should be noted that some objects may have certain customizable attributes which are not included in any customization records—for example, if the system limits their update to a separate (standalone and hard-wired) property dialog. In such a case, these attributes (which do not have customization records) will not be included in the automatically-created dialogs and are not part of the discussion herein.

Figure 5:
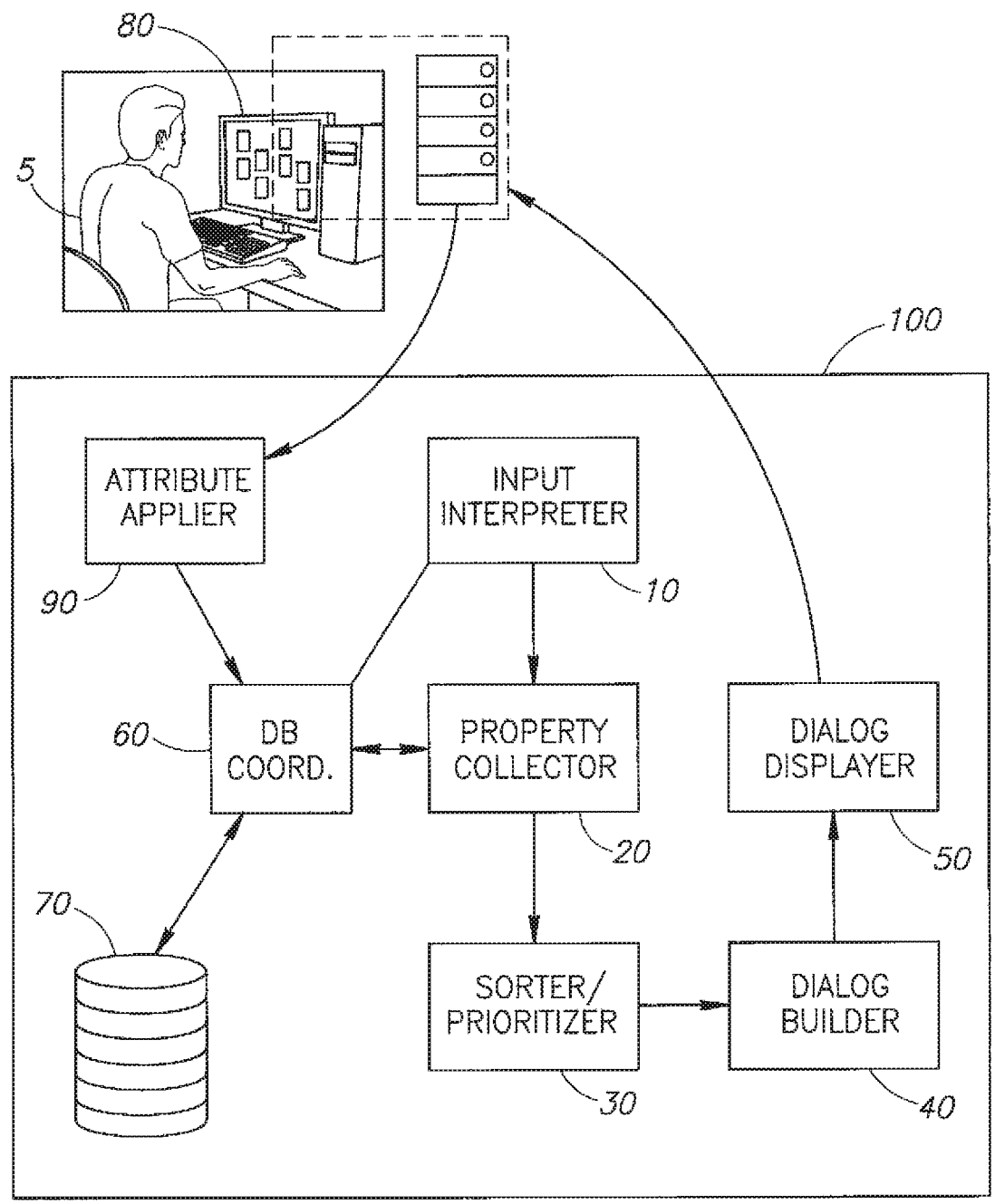
FIG. 5 is a schematic illustration of a system for automating the customization of a website dialog, constructed and operative in accordance with the present invention.

Reference is now made to FIG. 5 which illustrates a system 100 for automating the customization of a website dialog according to an embodiment of the present invention. System 100 comprises an input interpreter 10, a property collector 20, a sorter and prioritizer 30, a dialog builder 40, a dialog displayer 50, a database coordinator 60, a database 70 and an attribute applier 90. Database 70 may store all the pertinent website building system components together with their pre-created customization records. Input interpreter 10 may process either a pre-defined sub-set or the designer 5 selection of components to be updated and property collector 20 may retrieve customization records for the pertinent components from database 70 via database coordinator 60. Sorter and prioritizer 30 may sort and prioritize the attributes of the pertinent customization records, dialog builder 40 may build a new customized dialog for designer 5 based on his selection and dialog displayer 50 may present the newly built dialog to designer 5 for his input. Attribute applier 90 may apply the designer 5 input and may update the components stored in database 70 accordingly. The functionality of these elements will be described in more detail herein below.

It will be appreciated that above mentioned selection of components to be updated may also be according to a user defined query.

Figure 6:
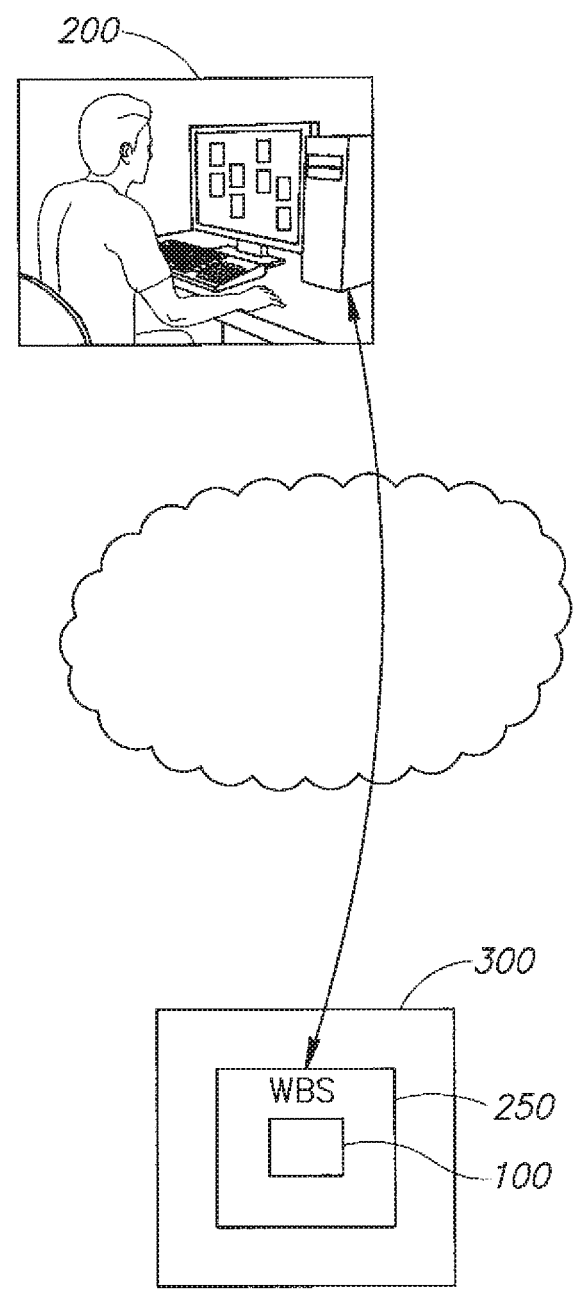
FIG. 6 is a schematic illustration of the implementation of the system of FIG. 5, constructed and operative in accordance with the present invention.

It will be appreciated that system 100 may be implemented as part of a website building system 250 either on a client 200 or a server 300 as is illustrated in FIG. 6 to which reference is now made.

Figure 7:
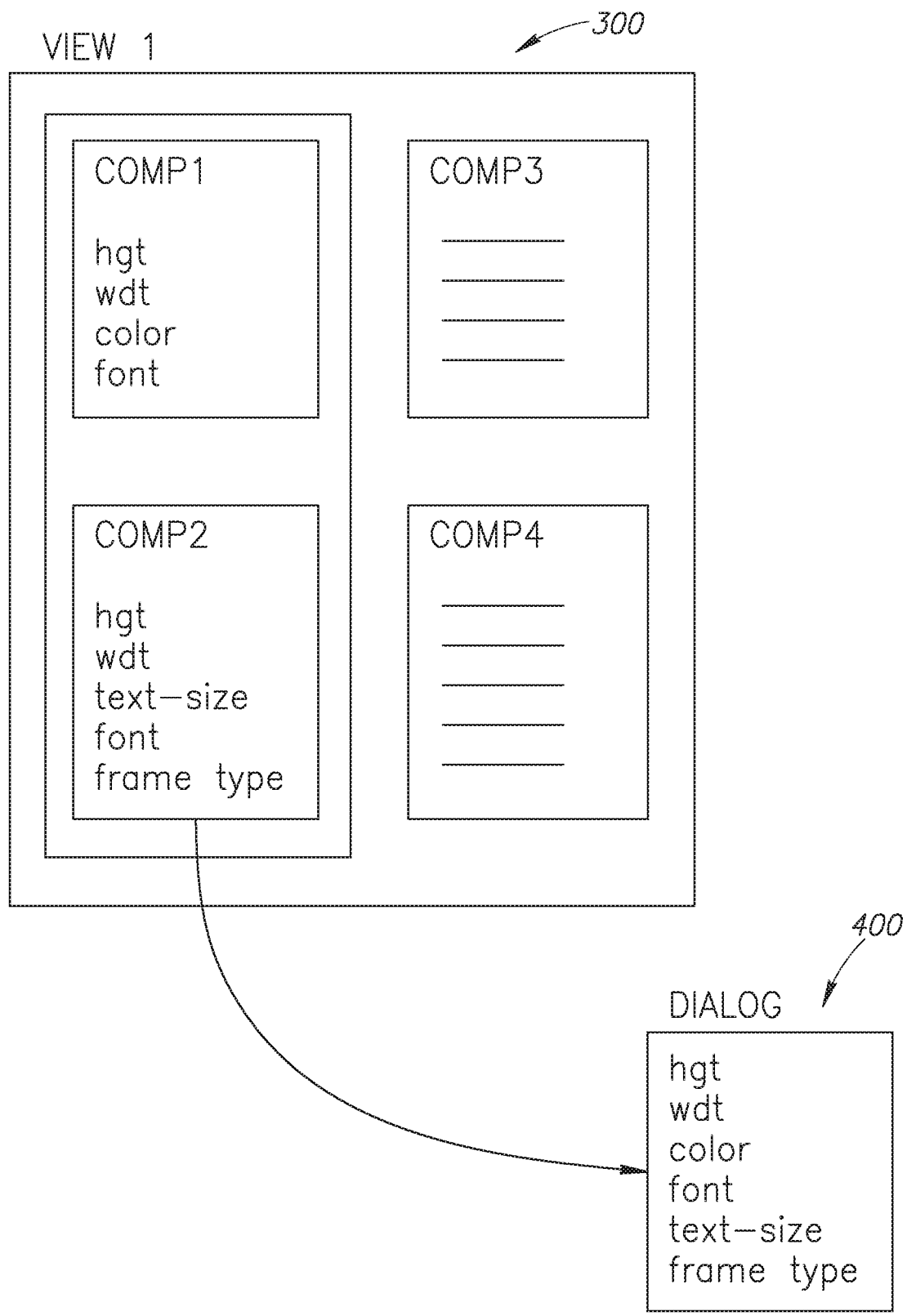
FIG. 7 is a schematic illustration of a customized dialog for a particular page view, constructed and operative in accordance with the present invention.

Reference is now made to FIG. 7 which illustrates an example customized dialog 400 for a view 300. The senior designer may create View 1 at the design stage containing 4 components, comp 1, comp 2, comp 3 and comp 4. The senior designer may also determine that comp1 may expose the customizable attributes hgt (height), wdt (width), color and font. Comp 2 may expose the customizable attributes hgt, wdt, text-size, font and frame type. Comp 3 and comp 4 may also expose other configurable attributes. It will be appreciated that comp 1 and comp 2 may typically have other attributes that are not exposed by the senior designer as configurable such as the coordinates of their location. Each customizable attribute may have an ID, a prompt text (e.g., for color it would be "select color") and a priority. These may all be pre-specified for each individual component and attribute. Alternatively, the senior designer may specify such customizations details at a higher entity level customization record (e.g. the view or page level as described hereinabove), with the per-component customization records only referencing the higher entity level customization record.

Junior designer 5 may wish to create a web page which uses View 1 (e.g. as a template, as part of a page or by attaching it to a given set of items). Designer 5 may decide that he needs to customize comp1 and comp 2 only, so he selects comp 1 and comp 2 and presses a customize button on the current dialog to enable some form of customization module activation. It will be appreciated that the selection made by designer 5 may be a single selection, a multiple selection, a selection area for intersecting components or multiple components in more than one view. In an alternative embodiment, designer 5 may not have the option to select individual components and system 100 may run using (for example) all the components in a given displayed view or views, thus automatically creating the complete customization dialog, obviating the need for junior designer selection and customization module activation. It will also be appreciated that occasionally system 100 may cache a pre-created dialog so to save time in re-creating it if no relevant change has been made to the underlying information. In such a scenario, the customization dialog may be integrated with the regular website building system interfaces and displayed automatically whenever designer 5 edits an area where customizations are relevant.

It will be appreciated that (with the exception of caching as noted above) a new customization dialog is created every time the process of system 100 is run even if a previous run has been made using the exact same components (as described in more detail herein below). Input interpreter 10 may receive the selection of the selected components and may instruct collector 20 to perform a recursive scan of comp 1 and comp 2 and all their related elements (be it sub-components, contained components, or otherwise related). Collector 20 may collect from database 70 (via coordinator 60) all the pre-defined customization records for comp1 and comp 2 and all their related elements. As discussed herein above, each component may have more than one customization record associated with it.

Sorter and prioritizer 30 may sort the records by customization ID to eliminate duplicates. For the example of FIG. 7, the attributes hgt, wdt and font will have the same ID. Sorter and prioritizer 30 may then prioritize the attributes of the pertinent customization records. The priority for each ID may be assigned based on the values given to it in the multiple occurrences of it as a customizable attribute. It will be appreciated that priorities may be set by senior designer or system designated. It will further be noted that the sorter and prioritizer 30 may combine priority values from multiple records using a combination metric (such as a maximum or average value), and may also take into account prioritization hints provided in the objects to be affected.

Next dialog builder 40 may build common dialog 400 with a united list of customizations for comp 1 and comp 2 i.e. hgt, wdt, color, font, text-size and frame type, displaying the highest priority customization first. Each customization may also be presented with its prompt text (e.g. "select color") and a value selection entry box 410.

It will be appreciated that it is possible to have multiple customization records for a specific property having the same ID. For example, one record may provide the text prompt "change width to:" while a different record with the same ID may provide the text prompt "enter new width:" In such cases dialog builder 40 may select the right value to use based on the attached priority, most common value, related component properties (e.g. select the value associated with the component(s) having the largest total area), order of definitions or any other method. Dialog builder 40 may also determine that they should be regarded as separate customization records if no conflict resolution has been found. It will be appreciated that multiple customization records having the same single ID may also be required if the same customization value may modify multiple attributes of a given component. For example, an "Enter margin" customization should apply the same value to the right and left margins of a component—which are separate attributes. In an alternative embodiment, system 100 may use customization records which include multiple sub-records for multiple affected component attributes.

It will be appreciated that dialog builder 40 may construct multiple types of dialogs such as linear dialogs and hierarchical dialogs (based on a hierarchy classification provided in the customization records, e.g. using hierarchical customization ID namespace) or may use a layout based on the layout of the components contributing the customization records. Such dialog creation may also be affected by dialog creation hints included in the customization records.

Figure 8:
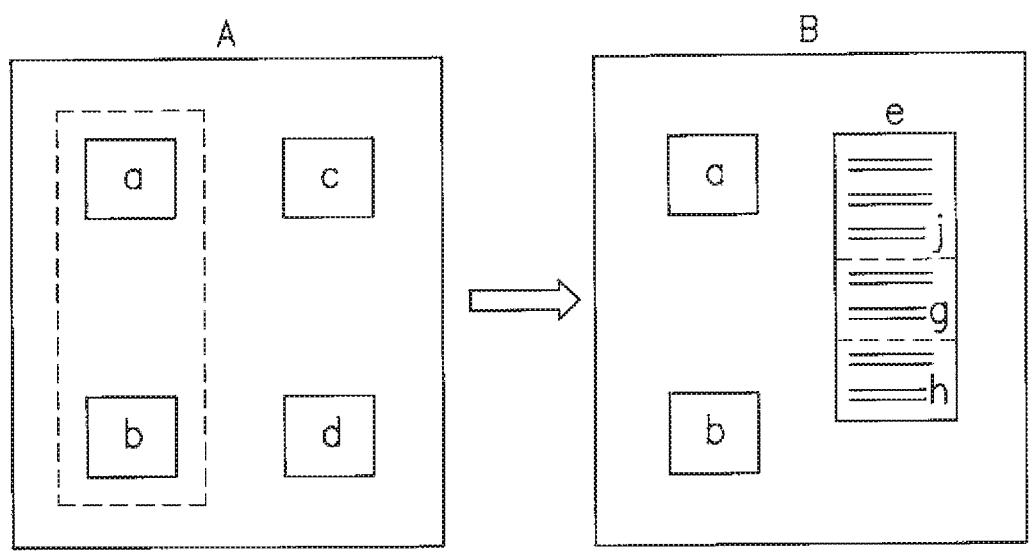
FIG. 8 is a schematic illustration of component layout based dialog creation, constructed and operative in accordance with the present invention.

Component layout based dialog creation is further illustrated in FIG. 8 to which reference is now made. As is shown, Page [A] includes components [a], [b], [c] and [d]. When components [a] and [b] are multi-selected and a "customize" function is invoked via system 100, page [A] is displayed as page [B] which shows components [a] and [b] as well as the automatically generated customization dialog [e]. Dialog [e] further includes 3 parts (from top)—[j], [g] and [h]. It will be appreciated that newly created dialog [e] is placed within page [B] so as not to hide components [a] and [b]. Furthermore, since [a] is higher than [b], the customizable attributes of [a] and [b] are displayed so that [a]-only attributes go to [j] at the top, [b]-only attributes go to [h] at the bottom and attributes common to both [a] and [b] go to the middle section [g]. The same may be applied for two-dimensional layout, creating the customization dialog by placing clusters of customization elements in the page, and using dynamic layout to provide space when required.

Dialog displayer 50 may then present the newly created dialog to designer 5 to receive his input via value selection entry box. It will be appreciated that during the interaction, designer 5 may apply the customization values of the relevant attributes, possibly using an implementation formula in order to provide a WYSIWYG feedback to the attribute changes.

Attribute applier 90 may receive the pertinent input from the designer and may update the customization records stored in database 70 accordingly (so that the last value entered could be shown on next invocation), as well as updating the relevant component attributes themselves using the implementation formula. Attribute applier 90 may apply the customizations specified by the designer in a number of ways. These ways may include: (a) affecting all (relevant) views within the current linking component (e.g. the behavior depicted in FIG. 3); (b) affecting the specific view instances selected by the designer, including the views added through the expansion process noted above—this affects only the specific item/view combination, so different instances of the same view may have different customizations and (c) affecting the view template definition rather than the view instance—so that any change to the said view shall apply to additional (or all) instances of the view within the website, including uses of the view within different web pages.

It will be appreciated that pages may act as template to other pages, including regular templates and views (such as templates associated with data items when displayed inside a linking component). It will be further appreciated that system 100 may also be used with list components as described herein above.

It will also be appreciated that system 100 may perform the entire functionality described above subject to a scope definition rule. For example, a page-based scope may unite components and customization records for all components in the page. A view-based scope may perform the uniting at the level of each view (as defined above), so that customizations having the same ID in different views may be regarded as different customizations. An example of this would be if a customization has the ID "space-below" for a component in the section view and the dish view such as illustrated in FIG. 2 back to which reference is now made. Two different "space-below" customizations may be created in the customization dialog. System 100 may also provide other scope definition rules.

Therefore a senior designer or website building system manufacturer may provide to a more junior designer user-friendly dialogs to aid the efficient building of his or her websites.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description above. In addition, embodiments of the present invention are not described with reference to any particular programming language. It will be appreciated that a variety of programming languages may be used to implement the teachings of the invention as described herein.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for a website building system, the method comprising:
   having a website built by said website building system, said website to be edited, said website having editable objects and said objects having pre-defined customizable attributes and non-customizable attributes;
   creating and presenting to said user a per-user-selection customization dialog for a set of objects selected by said user, wherein said dialog shows only said customizable attributes of said set of user-selected objects;
   receiving input from said user via said customization dialog for attributes of at least one of said set of user selected objects; and
   updating at least one of said set of user selected objects according to said input.

2. The method according to claim 1 wherein said creating and presenting comprises filtering said customizable attributes for said set of user selected objects.

3. The method according to claim 1 wherein said creating and presenting comprises ranking the importance of said customizable attributes for said set of user selected objects.

4. The method according to claim 1 wherein said updating comprises enabling bulk updates of attributes of said set of user selected objects.

5. The method according to claim 1 wherein said updating comprises updating multiple said user selected objects based on a single customization of an attribute of one of said set of user selected objects.

6. The method according to claim 1 wherein said creating and presenting comprises at least one of: updating an existing customization dialog and creating a new customization dialog.

7. The method according to claim 6 wherein said creating comprises overriding predefined and pre-supplied existing customization records for said object.

8. The method according to claim 6 wherein said creating occurs at least at one of: a view level, a container level, the entire page level, and the website level.

9. The method according to claim 1 wherein at least one of: said at least two user selected objects, has at least one associated customization record wherein said at least one customization record specifies configuration rules for a single attribute of an object of said user selected objects.

10. The method according to claim 9 wherein said at least one customization record comprises at least one of: a customization ID, a customization prompt text, a specific implementation formula, and a default value.

11. The method according to claim 9 wherein said creating and presenting comprises sorting and prioritizing said customizable attributes.

12. The method according to claim 11 wherein said sorting and prioritizing comprises sorting by customization ID.

13. A system for a website building system, the system comprising:
   a website built by said website building system, said website to be edited, said website having editable objects and said objects having pre-defined customizable attributes and non-customizable attributes;
   a dialog builder to create and present to said user a per-user-selection customization dialog for a set of objects selected by said user, said customization dialog showing only said customizable attributes of said set of said objects and said customization dialog to receive input from said user for attributes of at least one said at least two user selected objects;
   an updater to update at least one of said at least two user selected objects according to said input; and
   a memory and a processor to embody said dialog builder and said updater.

14. The system according to claim 13 wherein said dialog builder filters said customizable attributes for said set of user selected objects.

15. The system according to claim 13 wherein said dialog builder ranks the importance of said customizable attributes for said set of user selected objects.

16. The system according to claim 13 wherein said dialog builder is limited by said website building system.

17. The system according to claim 13 wherein said updater enables bulk updates of attributes of said set of user selected objects.

18. The system according to claim 13 wherein said updater updates multiple said at least two user selected objects based on a single customization of an attribute of one of said set of user selected objects.

19. The system according to claim 13 wherein said dialog builder performs at least one of: updating an existing customization-dialog and creating a new customization dialog.

* * * * *